United States Patent

Wenzel

[11] 4,350,241
[45] Sep. 21, 1982

[54] MOBILE DELIVERY FLOW EQUALIZER

[75] Inventor: Jürgen-Michael Wenzel, Düsseldorf, Fed. Rep. of Germany

[73] Assignee: Mannesmann Demag, A.G., Fed. Rep. of Germany

[21] Appl. No.: 194,676

[22] Filed: Oct. 6, 1980

Related U.S. Application Data

[63] Continuation of Ser. No. 33,851, Apr. 27, 1979, abandoned.

[30] Foreign Application Priority Data

May 18, 1978 [DE] Fed. Rep. of Germany ....... 2821674

[51] Int. Cl.$^3$ .................... B65G 41/00; B65G 47/18
[52] U.S. Cl. .................................. 198/311; 198/318
[58] Field of Search ............... 414/332, 376, 572–574; 198/311, 312, 316, 318, 544, 547, 557, 616

[56] References Cited

U.S. PATENT DOCUMENTS

| 809,373 | 1/1906 | Hof et al. | 198/311 |
| 890,021 | 6/1908 | Camp | 198/547 |
| 1,126,748 | 2/1915 | Gledhill | 198/616 |
| 1,833,192 | 11/1931 | Waterman | 198/311 |
| 2,384,242 | 9/1945 | Fitch | 198/616 X |
| 2,410,012 | 10/1946 | Churchman | 198/311 X |
| 2,538,308 | 1/1951 | Grahl | 198/311 X |
| 2,912,095 | 11/1959 | Palmer et al. | 198/316 |

FOREIGN PATENT DOCUMENTS

| 355468 | 6/1922 | Fed. Rep. of Germany . |
| 650030 | 9/1937 | Fed. Rep. of Germany . |
| 2636776 | 2/1978 | Fed. Rep. of Germany . |
| 1382320 | 11/1964 | France . |
| 2067549 | 8/1971 | France . |
| 2226549 | 11/1974 | France . |
| 558803 | 1/1944 | United Kingdom . |
| 1184903 | 3/1970 | United Kingdom . |
| 1353772 | 5/1974 | United Kingdom . |
| 1421285 | 1/1976 | United Kingdom . |
| 1459544 | 12/1976 | United Kingdom . |

OTHER PUBLICATIONS

Australian Reference—Technical Press Ltd., "The Coaling of Railway Engines".

Primary Examiner—Johnny D. Cherry
Attorney, Agent, or Firm—Mandeville and Schweitzer

[57] ABSTRACT

A mobile bulk goods delivery system is provided for spacing and evening out the delivery of quantities of bulk goods received so that subsequent operations in a production line are not jammed with intermittent overload quantities of bulk goods to be processed. The delivery system of the disclosure is an equalizer mounted on a mobile support for pivoting around a horizontal axis. The equalizer includes a delivery belt system which has positioned on one end thereof a bulk goods receiving container pivotally mounted, again on a horizontal axis. The equalizer is capable of being moved from one location to another, as desired. The configuration of the container with respect to the support is such that the container, when in its operative position, is recessed below ground level, and when being moved from one location to another, is maintained above ground level. The delivery belt of the invention is arranged to extend into the pivotally mounted container for first receiving the goods and then delivering them in even distribution to subsequent operations.

4 Claims, 6 Drawing Figures

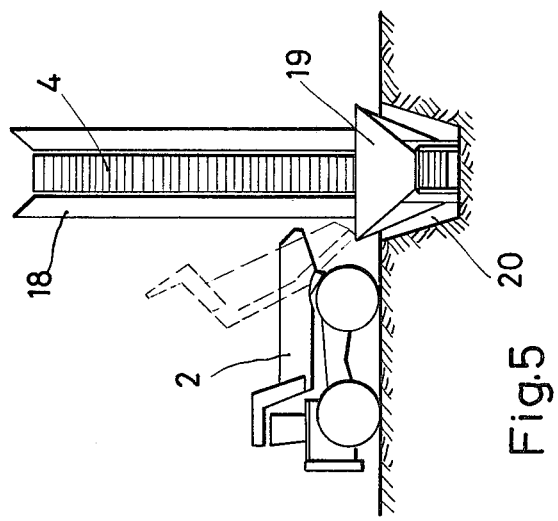
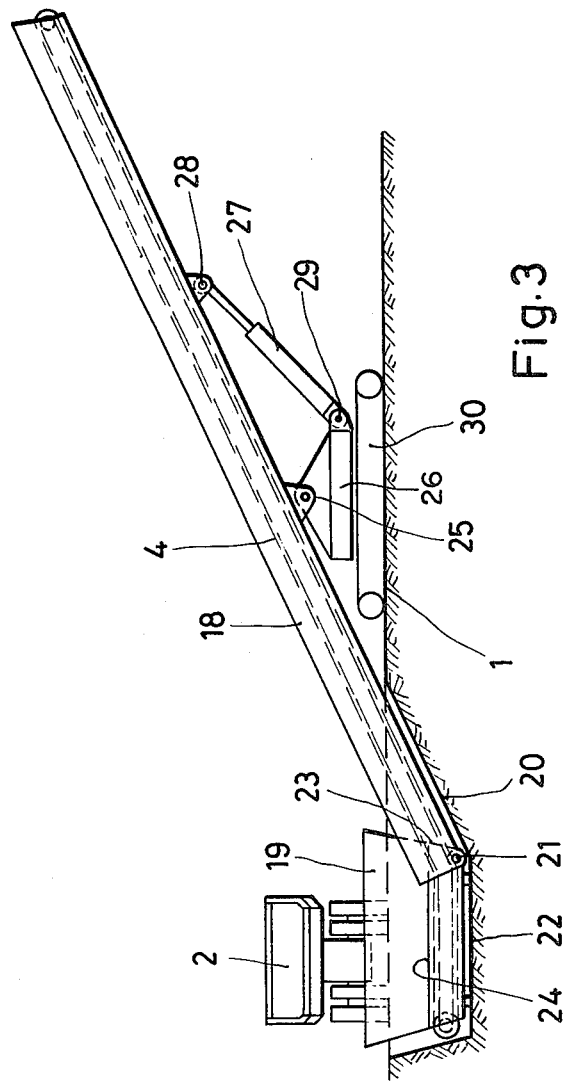
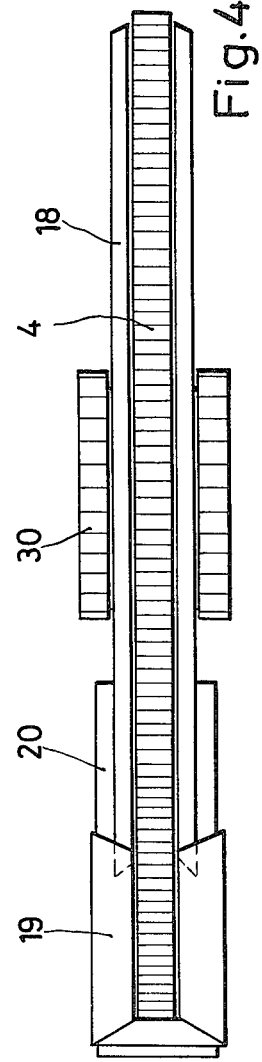

MOBILE DELIVERY FLOW EQUALIZER

This is a continuation of application Ser. No. 33,851, filed Apr. 27, 1979 and now abandoned.

BACKGROUND AND SUMMARY OF THE INVENTION

The present invention relates to a mobile delivery flow equalizer provided with a bunker below the ground or operating level to receive bulk material unloaded from trucks, and with a conveyor belt system to transfer the bulk material from the bunker to subsequent elements in an open-cast equipment chain of operations, particularly screening and reducing installations before being removed by conveyor belts.

Such delivery flow equalizers are predominately employed in solid rock open-cast operations, where growing rubble and ore quantities increasingly require the use of conveyor belt systems. The problem is that the bulk material delivered in heavy-duty trucks of up to 320 tons service load might not be fit to be conveyed on a belt due to too great a quantity at one time. The oversize deliveries must, therefore, be sorted out or reduced. Since the reducing plants cannot handle the great quantities of rock and ore suddenly occurring during the transfer from the trucks, the plants are preceded by the delivery flow equalizers, guaranteeing a uniform delivery.

Several methods are known for unloading the trucks, to transfer the bulk material to the delivery flow equalizers. It is usual to empty the truck from a ramp which can be traveled by trucks starting from a banked up slope. The artificially banked up slope, however, entails the risk of collapse from the weight so that this method is restricted to comparatively light trucks and low level slopes. The ramp following the slope must be formed as a heavy artificial structure, which results in an installation which can no longer be called mobile due to the structural unit of slope and ramp. Another disadvantage is the necessary hoisting form of operation required with a dead load, as well as the time loss incurred in traveling the slope and the ramp. Finally, this method only permits unloading of one truck at a time.

Another past method offers more favorable discharging facilities in that a discharge trench is dug out in the level ground. The trucks are emptied into this discharge trench. To receive the bulk material, however, it is necessary to provide a paddle wheel or similar lifting device, raising and transferring the discharged goods to a conveyor belt system which moves to the next equipment in the processing chain. Furthermore, the trench can only be filled by the trucks from one side. Also, very bulky pieces may cause difficulties in pick-up by the reloading or pick-up device. Finally, it has to be noted that the use of the reloading device considerably increases the cost of the entire plant.

Based on these problems, it is the object of the present invention to improve upon a mobile delivery flow equalizer of the type described in the principal concept as described in claim one so that a most mobile installation provided with low structural requirements, which is of maximum efficiency regarding the receiving and transfer of the bulk goods and which, as a substantial structure, is easily adapted to the varying conditions of solid-rock open-cast operations. This is achieved by using a receiving bunker consisting of an open-top container, structurally joined to the supporting frame of a conveyor belt system, with such container being partially sunk into a prepared excavation provided below the ground operating level, and below the discharge height of the trucks.

The bunker is "mobile" by simply digging out an excavation ion in accordance with the size of the container by means of equipment available and used anyway in open-cast operation. Then the container is sunk into the excavation. The excavated material is partially used to fill in the container so that the trucks may approach it without the necessity of ramps, slopes or other inclines out of the travel plane. Another feature of the invention is that the conveyor belt of the conveyor belt system extends into the container as well as out of it so that the conveyor belt forms essentially the bottom of the container. This results in a simple solution obviating the need for reloading devices, such as the paddle wheels used heretofore. The bulk goods discharged into the container are directly charged onto the conveyor belt, and removed by means of the conveyor belt system laterally from the container towards the next following processing elements.

Preferably, the container is pivotally connected to the supporting frame of the conveyor belt system to swivel around a horizontal axis. This allows the container to adapt to the depth of the excavation, and yet adheres uniformly to the bottom surface. This relieves, in a favorable manner, the supporting frame of the conveyor belt system of the great weight of the bulk material, so that it may be constructed rather light weight in form.

Another feature of the invention is that the conveyor belt system itself rotates around a horizontal pivot, and rests on a scaffold element supported on the level ground. This feature facilitates lifting the bunker container by swiveling the supporting frame of the conveyor belt system around its horizontal pivot support and lifting it out of the prepared excavation. This is of particular advantage because another feature of the invention provides that the scaffold supporting element carrying the conveyor belt system is equipped with a drive, which may be, for example, a caterpillar drive.

By providing a piston cylinder unit engaging the scaffold element on one end and the supporting frame of the conveyor belt system on the other end, the conveyor belt system may be pivoted on the horizontal axis, and an apparatus is provided which is of maximum mobility. By means of the piston cylinder unit, the supporting frame of the conveyor belt system with the bunker container as a structural unit may be easily rotated or swiveled around the horizontal axis, so that the container may be lifted out of the excavation in the level ground. This makes the entire installation freely mobile, if it is arranged on the carriage as proposed by the invention.

An example of the invention is shown on the drawings as follows:

BRIEF DESCRIPTION OF THE DRAWINGS

FIG. 3 is a somewhat diagrammatic illustration of apparatus embodying the invention;

FIG. 4 is a simplified diagrammatic top plan view of the apparatus of FIG. 3;

FIG. 5 is a front elevational view of the apparatus of FIG. 3; and

DETAILED DESCRIPTION OF THE DRAWINGS

Figure 1:
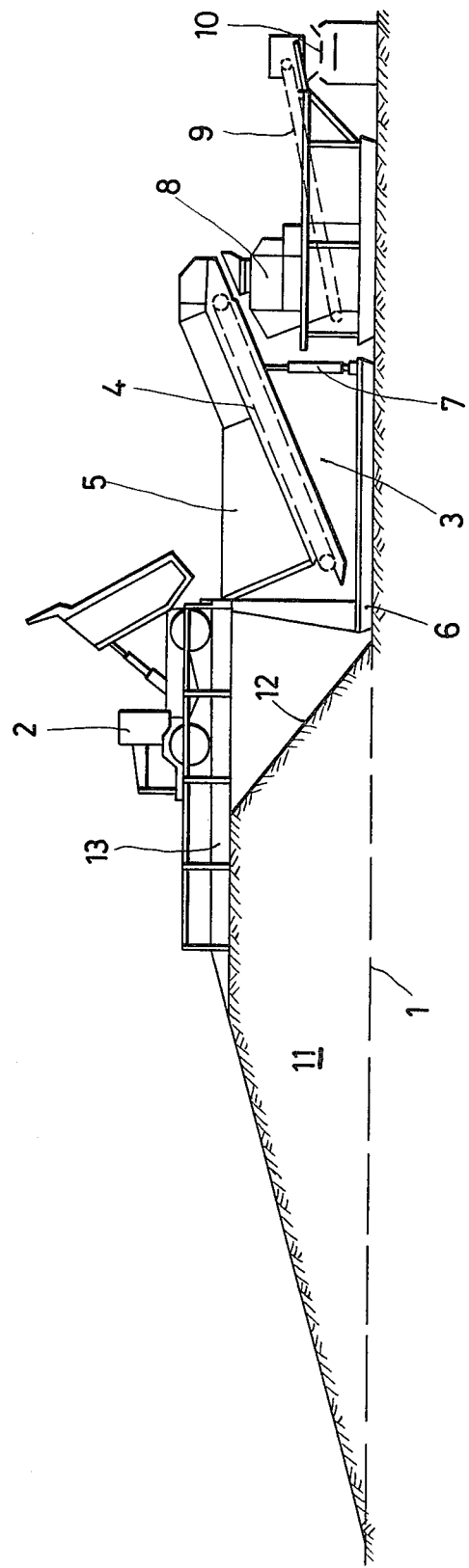
FIG. 1 is a somewhat diagrammatic side elevational view illustrating one form of prior art apparatus.

FIG. 1 indicates with 1 the open-cast operating ground level which is traveled by the heavy trucks 2. The known delivery flow equalizer is designated by 3. It consists of conveyor belt 4 on a supporting frame, with an expanded receiving chute 5, arranged on supporting frame 6 and which may be raised and lowered by means of a piston cylinder unit 7. The conveyor belt 4 unloads the bulk goods emptied by truck 2 into the hopper of a reducing plant 8, from where the reduced material is transferred by conveyor belt 9 to the removing conveyor belt 10. In order to attain the necessary discharge height, truck 2 must be brought to a level above conveyor belt 4. To this end, starting from the open-cast operating ground level 1, a ramp 11 is banked up whose oblique slope 12 is compensated for by an artificial support construction 13 on the discharge side. As already explained, this construction has considerable flaws. Particularly, the mobility of the plant is largely lost, and trucks 2, which may only travel individually on ramp 11, must execute a considerable amount of hoisting work of service and dead load.

Figure 2:
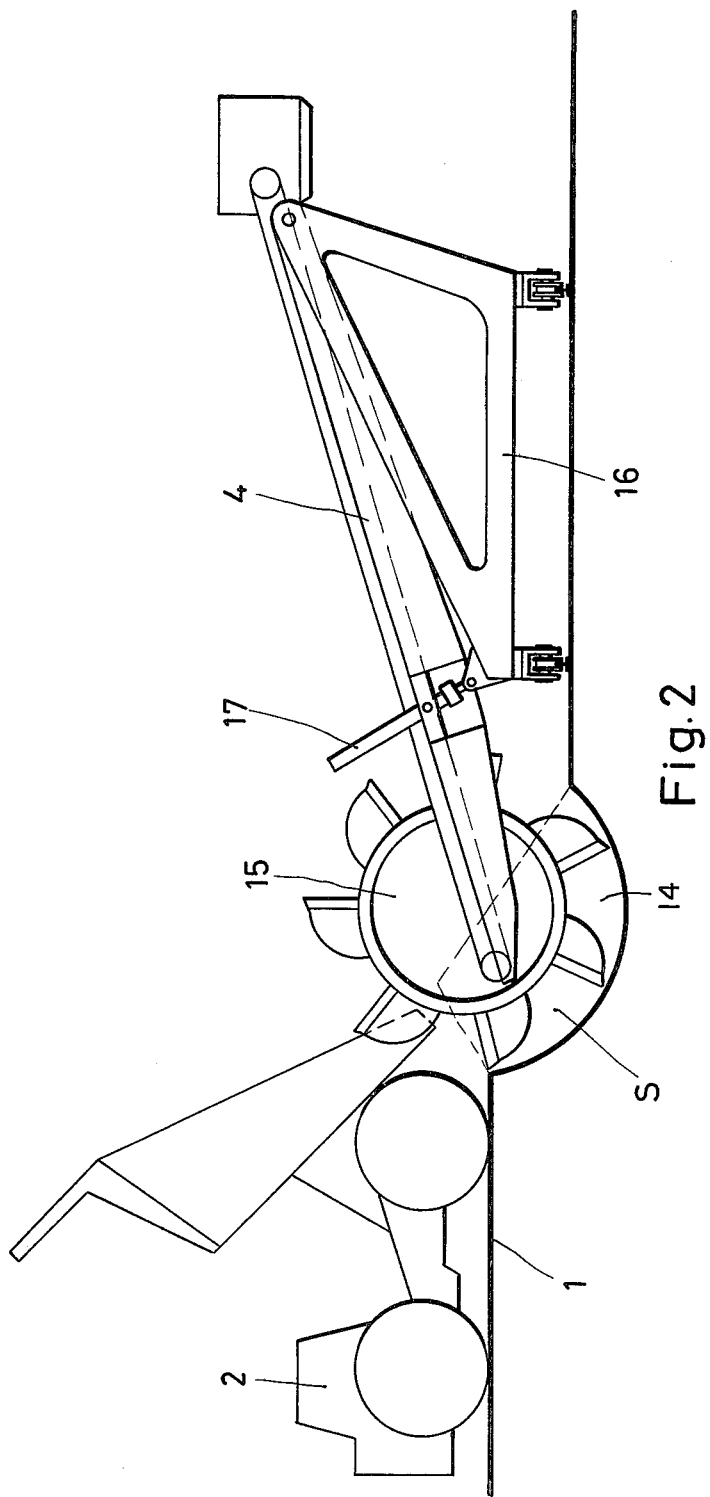
FIG. 2 is a further diagrammatic side elevational view illustrating another form of prior art apparatus.

FIG. 2 shows another known method which is improved upon by the invention. Here, a discharge trench 14 is dug out on the open-cast operating level which receives bulk goods S emptied by truck 2. Reloading or picking up from the trench 14 is done by means of a separate paddle wheel 15, which carries the picked up goods S to conveyor belt 4. Belt 4 serves to remove the bulk goods in the same manner as in FIG. 1, bringing them, for example, to a reducing plant (not shown). The conveyor belt system is arranged on a scaffold support 16 and joined to the latter so that it may be raised and lowered as at 17. The disadvantages of this installation have also been described before. Here, it may be pointed out again that the construction becomes very involved due to the necessary reloading of paddle wheel 15.

The present invention is illustrated in FIG. 3. The supporting frame 18 receiving the conveyor belt system 4 carries at its receiving end the container 19 formed as bunker, which is sunk into an excavation 20 in the open-cast operating level 1 only to the extent where part of the walls of container 19 show. Container 19 is hinged on supporting frame 18 of the conveyor belt system to pivot around horizontal axis 21, so that the container adapts to the bottom surface 22 of excavation 20. The protruding lateral walls of container 19 at the same time prevent the trucks from backing up too much, their rear wheels being stopped at the edges of excavation 20 by the walls. As is shown in FIG. 3, the conveyor belt 4 leads laterally into container 19 at 23 and runs along the bottom area 24 of container 19.

The supporting frame 18 of the conveyor belt system 4 is hinged with the scaffold element 26 at 25 and swivels around a horizontal axis, for which the piston cylinder unit 27 is provided which engages the supporting frame 18 at 28 and the scaffold element 26 at 29. This makes it possible, by retracting the piston cylinder unit 27, to lift container 19 with the front part of supporting frame 18 and conveyor belt system 4 out of excavation 20 in order to move the installation. To this end, a caterpillar drive 30 is provided, which travels on the open-cast operating plane 1. FIG. 4 is a top plan view of the apparatus of FIG. 3, whereby like parts bear like numbers.

In FIG. 5, as well, like parts bear like numbers. Truck 2 is arranged on the left of container 19 in this example. It could, however, advantageously also be approached from the other two free sides. It is also possible that three trucks unload the bulk goods simultaneously.

Figure 6:
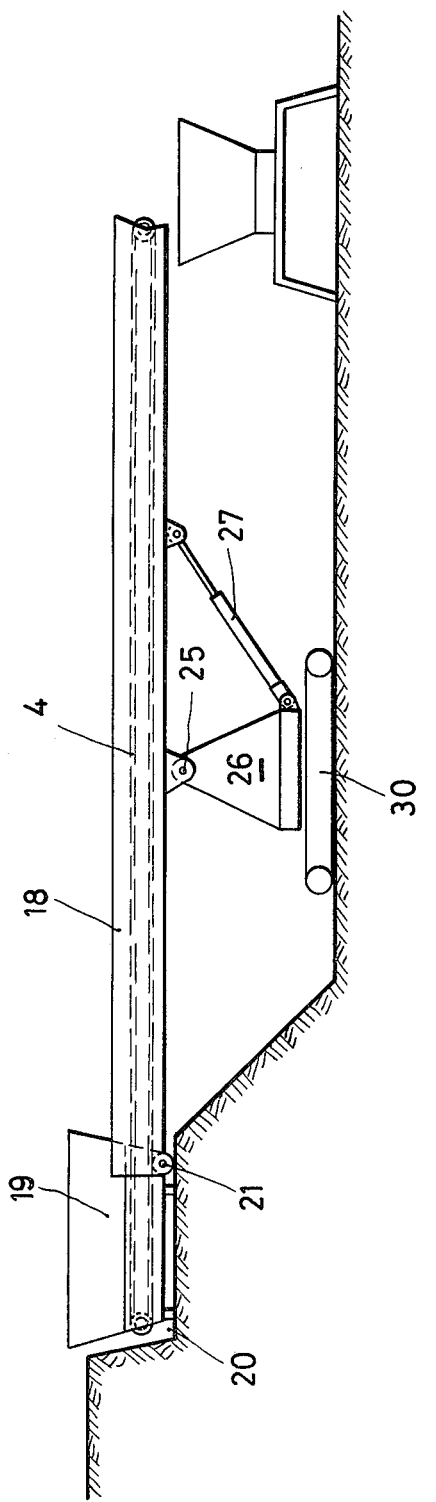
FIG. 6 is a slightly modified form of the apparatus of FIG. 3 in side elevation and showing a different positioning thereof to conform to a different operating site.

In FIG. 6, the delivery flow equalizer of the invention is set up so that container 19 rests on a slope. The slope is, in identical manner provided with an excavation 20 into which container 19 is positioned. The articulated arrangement 21 of container 19 at the supporting frame 18 of the conveyor belt system 4, joined with the flexible support of the supporting frame 18 supported on modified scaffold element 26, permits, in an easy fashion, the adaptation of the plant to existing conditions in the terrain, thus guaranteeing unlimited mobility of the installation.

The special advantage of the invention consists of the notably simple construction of the installation, which is of greatest mobility and ready for use wherever required, the only necessity being an excavation to be made by means of one of the vehicles which are usually found at open-cast work areas anyway.

I claim:

1. A mobile delivery flow equalizer adapted to be placed into an excavation below ground level and adapted to receive and transmit bulk goods from wheeled vehicles, said delivery flow equalizer having an operational mode for receiving and transmitting bulk goods and a transport mode for moving the delivery flow equalizer from one working site to another, comprising (a) an open-topped bulk goods receiving container;

(b) a supporting frame attached at one end of said container;

(c) an endless conveyor located within said supporting frame;

(d) one end of said conveyor in communication with the interior of said container;

(e) the other end of said conveyor adapted to be placed in communication with a remote processing station;

(f) said container having a horizontal pivoting axis, such that, in the operational mode, the bottom surface of said container is adapted to lie substantially flush upon the bottom of an excavation at various excavation depths beneath ground level and, in the transport mode, said container is supported above ground level;

(g) said container having upwardly extending side walls of predetermined length adapted to extend at least slightly above the ground level when said container is located on the bottom of an excavation;

(h) said side walls of predetermined length being adapted to provide positive stopping surfaces for wheeled vehicles which are driven up to said side walls when said container is located on the bottom of an excavation for unloading bulk goods into said container;

(i) said side walls of predetermined length being adapted to be low enough above ground level when said container is located on the bottom of an excavation as to enable wheeled vehicles to unload said bulk goods into said container from more than a single side of said container;

(j) a transport and tilting means attached to said supporting frame, said transport and tilting means serving to selectively move said delivery flow equalizer from one site to another site and, in addition, serving to move said supporting frame from a first position when said delivery flow equalizer is in its operational mode to a second position when said delivery flow equalizer is in its transport mode; and (k) said supporting frame holding said container in a cantilevered manner, such that said container is above ground level when said delivery flow equalizer is in its transport mode and below ground level when said delivery flow equalizer is in its operational mode.

2. A mobile delivery flow equalizer as claimed in claim 1, wherein said supporting frame is itself pivotable about a second horizontal axis.

3. A mobile delivery flow equalizer as claimed in claim 1, wherein said transport means is in the nature of a caterpillar type drive.

4. A mobile delivery flow equalizer as claimed in claim 1, wherein said supporting frame is provided with a second horizontal axis and said transport and tilting means comprises a piston-cylinder means secured beneath said supporting frame for providing selected lever-like movement of said supporting frame and conveyor about said second horizontal axis of said supporting frame.

* * * * *